May 6, 1941.　　　R. E. GREBE　　　2,241,303
HOT-AIR FURNACE
Filed Jan. 17, 1939　　　2 Sheets-Sheet 1
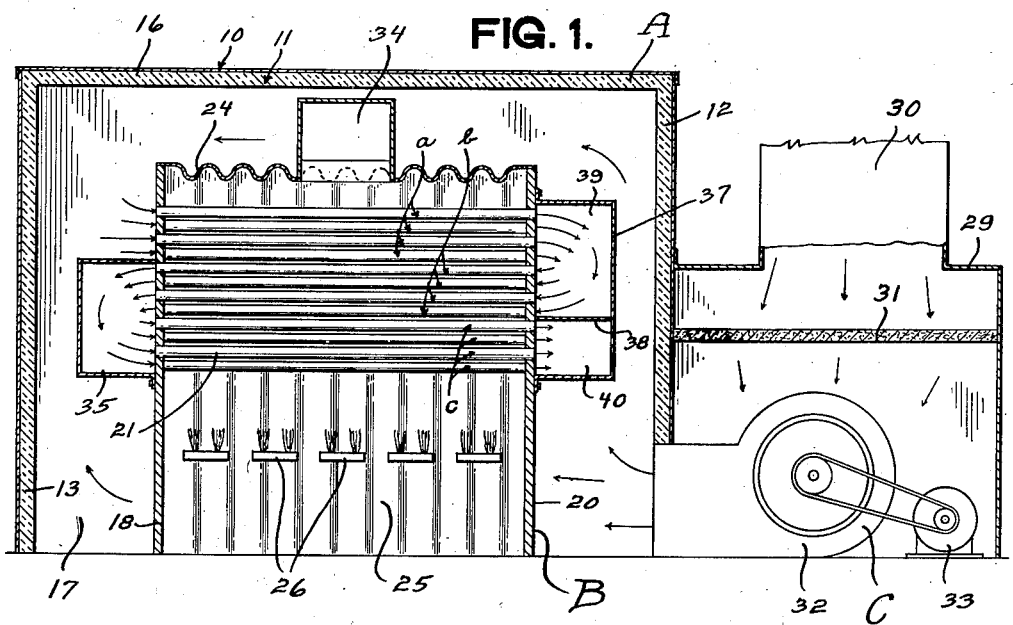
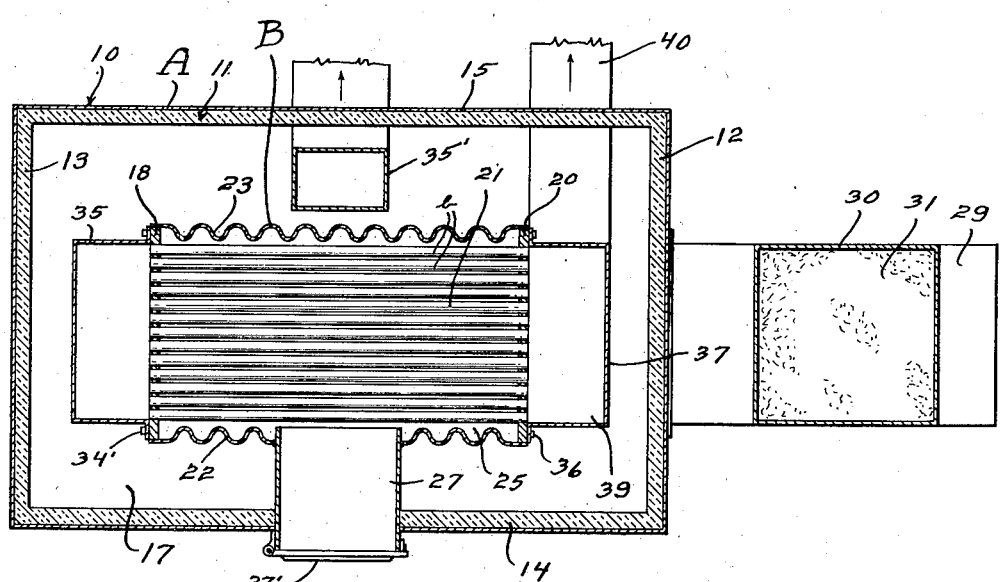
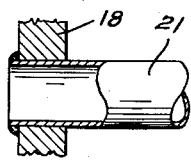
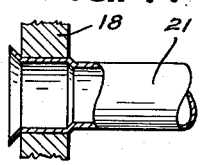
INVENTOR.
Roland E. Grebe.
ATTORNEYS.

May 6, 1941.  R. E. GREBE  2,241,303
HOT-AIR FURNACE
Filed Jan. 17, 1939  2 Sheets-Sheet 2

INVENTOR.
Roland E. Grebe.

BY Lancaster, Allwine and Rommel
ATTORNEYS.

Patented May 6, 1941

2,241,303

UNITED STATES PATENT OFFICE 2,241,303

HOT-AIR FURNACE

Roland E. Grebe, Avalon, Pa.

Application January 17, 1939, Serial No. 251,424

5 Claims. (Cl. 126—109)

The present invention relates to heating equipment and the primary object of the invention is to provide an improved air heating furnace which will be extremely efficient in operation and quickly responsive to control for delivering properly warmed air in the minimum length of time.

The usual hot air heating furnace is not only inefficient in operation in that it is wasteful of fuel, but is also slow in responding to the desired temperature when starting up the furnace as well as when an increase in heat is desired during operation because of the small heating area exposed to the air being heated. While various arrangements have been adopted to increase this heating area, such as by means of fins etc., or by causing the products of combustion to travel a tortuous path over the heating area, such has not materially increased the heating efficiency and such furnaces are not quickly responsive to changing demands for more or less warmed air at varying temperatures.

It is therefore a further object of the present invention to provide a hot air heating furnace of low cost and economical in fuel consumption, and wherein a maximum contact of the air being heated against the heating surface is provided.

A further object resides in the provision of an improved heating element for hot air furnaces whereby maximum heat absorption is obtainable without objectionable overheating of the equipment and resultant frequent replacements.

A further object resides in the construction whereby the air being heated is so conducted thru the furnace as to be increasingly warmed thru contact with successively hotter heating surfaces in its heat absorbing passage thru the furnace.

Other objects and advantages of the invention will be apparent during the following detailed description, taken in connection with the accompanying drawings, forming a part of this specification and in which drawings:

Figure 1 is a vertical longitudinal section thru the improved hot air heating furnace.

Figure 2 is a horizontal section thru the furnace.

Figure 6 is a fragmentary detail section showing one manner of securing the air pass tubes in the tube sheets.

Figure 7 shows a modified manner of securing the air pass tubes in the tube sheets.

Figure 3:
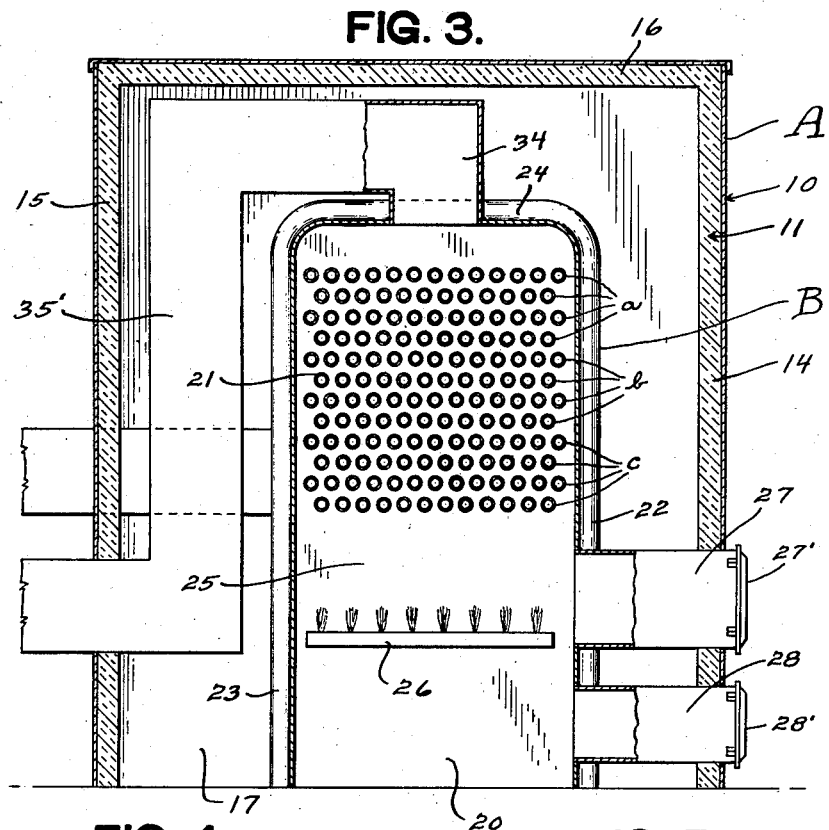
Figure 3 is a vertical transverse section thru the furnace on a slightly enlarged scale from that shown in Figure 1.
Figure 4:
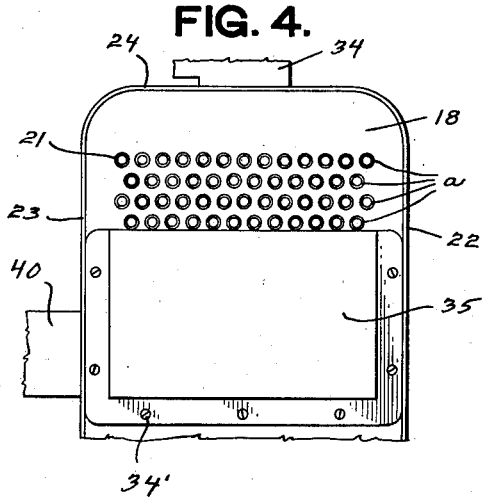
Figure 4 is a fragmentary end view of the upper portion of one end of the heating element.
Figure 5:
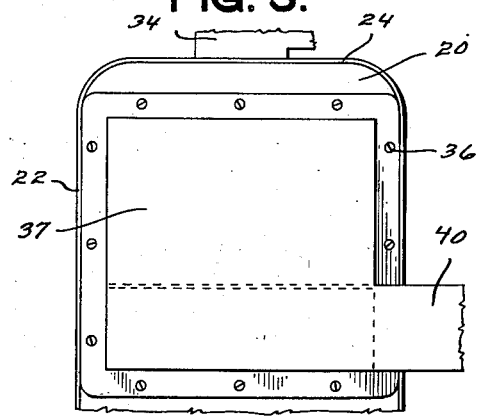
Figure 5 is a fragmentary end view of the upper portion of the opposite end of the heating element from that shown in Figure 4.

Referring to the drawings in detail and wherein like reference characters designate corresponding parts thruout the several views, the hot air heating furnace comprises an outer jacket A enclosing a heating element B, and C designates an air feeding and circulating means for the furnace and delivering air into the jacket A about the heating element B.

The jacket A is of hollow rectangular shape and comprises a sheet metal outer casing 10 having a lining of insulation 11 providing vertical end walls 12 and 13, vertical front and rear walls 14 and 15 respectively, and a top wall 16 providing a closed air chamber 17. The end, side and top walls of the jacket are all spaced from the heating element or unit B, whereby the air chamber 17 extends about the ends, sides and over the top of the heating unit as clearly shown in Figures 1 and 2.

The heating element or unit comprises vertical end walls 18 and 20 providing a pair of tube sheets in which are fastened the ends of a plurality of horizontally disposed air pass or transfer tubes 21 which are preferably arranged in vertically staggered relation. Connecting the end walls or tube sheets 18 and 20 is a preferably corrugated shell structure providing vertical front and rear walls 22 and 23 respectively and a top wall 24. These corrugated walls 22, 23 and 24 are preferably welded at their edges to the sides and top edges of the tube sheets 18 and 20 and provide a closed combustion chamber 25 within the air chamber 17. As will be noted, the corrugations in the walls 22, 23 and 24 extend parallel with the tube sheets 18 and 20 and provide a flexible or expansible coupling between the tube sheets. The air pass tubes 21 are arranged in the upper portion of the combustion chamber 25 and in the example shown, burners 26 are provided below the tubes as a source of heat. If so desired, however, a suitable grate may be substituted for the burners when using coal or other similar fuel as a source of heat. Opening thru the front wall 22 of the heating unit, into the lower portion of the combustion chamber 25, are suitable ducts 27 and 28 which extend exteriorly of the jacket A and have closing doors 27' and 28'. These ducts provide access and air inlet passageways to the combustion chamber 25.

The means C for delivering air to be heated into the air chamber 17 comprises a casing 29 arranged at the end wall 12 and having a fresh or cold air inlet duct 30 opening into the upper side thereof. Arranged in the casing 29 is a suitable air filter 31 thru which the inlet air is drawn and directed into the air chamber 17 thru an opening in the end wall 12 by means of a suitable fan or blower 32 which is driven by a motor 33. As will be observed in Figure 1, the air is directed into the lower portion of the air chamber 17 at one end thereof.

Opening thru the top wall 24 of the heating unit to communicate with the combustion chamber 25 is a flue gas outlet duct 34 which extends rearwardly and then downwardly in the space between the heating unit and the rear wall of the jacket as at 35' in Figure 3 and then extends thru the rear jacket wall 15 for conducting gases from the combustion chamber to a suitable flue or the like. Thus the hot gases from the combustion chamber 25 travel thru the relatively long outlet duct within the air chamber 17 before passing exteriorly of the jacket A.

Referring again to the heating unit B and particularly to the manner in which the air being heated travels thru the furnace, in the example shown, the horizontally disposed air pass or transfer tubes 21 are arranged in three superposed groups providing an upper or inlet group $a$, an intermediate group $b$ and a lower or outlet group $c$. Secured to the end wall or tube sheet 18 by means of cap screws 34' so as to extend over the open ends of the groups of tubes $b$ and $c$ is a housing 35 providing an air transfer duct between the groups of tubes $b$ and $c$. As shown in Figure 1, the top group of tubes $a$ communicate thru the tube sheet 18 with the air chamber 17.

Secured to the end wall or tube sheet 20 as by cap screws 36 is a housing 37 having a horizontal partition 38 dividing the housing into upper and lower compartments on a line between the groups of tubes $b$ and $c$. The upper compartment 39 of the housing 37 provides an air transfer duct for transfer of the air from the upper group of tubes $a$ to the intermediate group of tubes $b$. The lower compartment of the housing 37 provides a warmed or heated air outlet duct 40 having communication with one end of the lower or outlet group of tubes $c$. Thus the air being heated enters one end of the upper group of tubes from the chamber 17 and travels in a zig-zag path thru the tubes to the heated air outlet duct 40. The outlet duct 40 serves to conduct the heated air to the desired places of heating. This duct 40 may extend thru the rear wall 15 of the jacket A.

In operation of the furnace, the air to be heated is drawn thru the inlet duct 30 and delivered into the chamber 17 by the fan or blower 32 driven by the motor 33. The speed of the motor may be automatically controlled by means of a suitable thermostat (not shown) which may be disposed at some suitable point in the heated air duct 40 to control the temperature of the heated air. The air delivered into the chamber 17 passes around and over the heating unit B where it is preheated and loss of heat from the heating unit is prevented. This air also passes about the long flue gas outlet 34 which also serves to preheat the air and prevent heat losses. Since the air is circulated thru the chamber 17, the outer surface of the heating unit B is wiped by a moving body of air from the blower so that heat from the heating unit is absorbed by this moving body of air. This preheated air from the chamber 17 then enters the upper group of parallel tubes $a$ and passes thru these tubes into the transfer duct 39 where it is delivered into the group of tubes $b$. After passing thru the tubes $b$, the air is transferred by the duct 35 into the lower group of tubes $c$ and from which the heated air is delivered into the outlet duct 40 which transmits the heated air from the heating element to the rooms or other places to be heated. Thus passage of the air thru the furnace will cause the air to be heated most efficiently due to the counter current flow whereby the cooler air first contacts the coolest portion of the heating surface and as this air is being increasingly warmed, it comes in contact with warmer portions of the heating surface, until finally the warmed air comes in contact with the hottest portion of the heating surface and consequently there will be only a small temperature differential between the air being heated and the heating surface.

While the air transfer tubes have been shown divided into three groups, it is to be understood that any desired number of these groups may be provided according to the amount of air to be heated and the degree of heating efficiency desired. Likewise, the groups of tubes may consist of any number of tubes in accordance with the amount of heating surface desired. Since the entire heating unit B is enclosed in an outer insulated jacket A, heat losses will be prevented.

The tubes 21 may either be fixed at their ends in the tube sheets as by welding as shown in Figure 6, or the ends of the tubes may be expanded and flared as shown in Figure 7.

By corrugating the walls 22, 23 and 24 of the heating unit B not only provides additional preheating surface for the air but also serves to take care of the difference in expansion between the connecting wall of the tube sheet and the tubes. This construction permits the tubes to be fixed at both ends in the tube sheet by means of welding or by expanding the tubes into the tube sheet in the manner commonly employed in installing tubes in tube sheets.

As will be noted, the air to be heated is delivered into the lower portion of the air chamber 17 about the heating unit and then has a downward direction of travel thru the heating unit in a counter direction to the upward flow of the heating gases.

Changes in details may be made to the form of invention herein shown and described, without departing from the spirit of the invention or the scope of the following claims.

I claim:

1. In a hot air furnace, an outer jacket, a heating unit in spaced relation within the jacket having a combustion chamber and forming an air space about the unit, superposed groups of horizontal air pass tubes in the upper portion of the combustion chamber and with the uppermost group of tubes opening at one end into said air space, air transfer ducts connecting the ends of the groups of tubes for causing the air to travel downwardly thru successive underlying groups of tubes, a heated air outlet communicating with the lowermost group of tubes, a flue pass outlet for the upper portion of the combustion chamber, and means for introducing air under forced circulation into the lower portion of the outer jacket.

2. In a hot air furnace, an outer jacket, a heating unit in the jacket in spaced relation to the walls of the jacket and having a combustion chamber, said heating unit providing a continuous air chamber about the sides, ends and top of the heating unit, groups of upper, intermediate and lower air pass tubes disposed horizontally in the upper portion of the combustion chamber and opening thru opposite walls thereof, an air transfer duct forming communication between one end of the upper group of tubes and the corresponding end of the intermediate group of tubes, a duct forming communication between the opposite end of the intermediate group of tubes and one end of the lower group of tubes, a heated air outlet communicating with the opposite end of the lower group of tubes, a flue pass outlet duct for the combustion chamber and extending for a substantial distance thru said air chamber, and means for introducing a flow of air into said air chamber.

3. In a hot air furnace, the combination of an outer jacket, a heating unit in spaced relation within the jacket and having a combustion chamber, a single air chamber about the top, sides and ends of the heating unit, horizontally disposed air pass tubes in the upper portion of the combustion chamber and arranged in superposed groups providing an upper inlet group opening at one end into said air chamber, an intermediate group and a lower outlet group, a transfer duct providing communication between one end of the upper group and one end of the intermediate group, a transfer duct providing communication between one end of the intermediate group and one end of the lower group, a heated air outlet duct communicating with one end of the lower group, and a blower for directing air into the lower portion of said jacket whereby the heating unit is wiped by a moving body of air for preheating the air prior to passage thru the air pass tubes.

4. In a hot air furnace, the combination with an outer jacket, of a heating unit in spaced relation within the jacket embodying end walls and corrugated side and top walls connecting said end walls and forming a combustion chamber, air pass tubes secured at their ends in and opening thru said end walls, transfer ducts providing communication between the ends of certain of the tubes for causing a downward direction of travel of air thru the tubes, a heated air outlet communicating with the lowermost tubes, and means for directing a flow of air into the jacket.

5. A heating unit for hot air furnaces comprising a pair of end walls, a corrugated shell secured to the edges of the end walls and forming a combustion chamber, horizontally disposed air pass tubes fixed at their ends in the end walls and arranged in superposed groups providing an upper inlet group, an intermediate group and a lower outlet group, an air transfer duct at one end wall providing communication between one end of the upper group and the intermediate group of tubes, an air transfer duct at the opposite end wall providing communication between one end of the intermediate group and the lower outlet group of tubes, and a heated air outlet duct communicating with the opposite end of the lower group of tubes.

ROLAND E. GREBE.